United States Patent [19]

Malmsten

[11] Patent Number: 5,162,622
[45] Date of Patent: Nov. 10, 1992

[54] EXHAUST SILENCER

[75] Inventor: Sven-Olof Malmsten, Kista, Sweden

[73] Assignee: Dorchester Enterprises Ltd., British Virgin Isls.

[21] Appl. No.: 623,742

[22] PCT Filed: Jun. 1, 1989

[86] PCT No.: PCT/SE89/00308
§ 371 Date: Dec. 13, 1990
§ 102(e) Date: Dec. 13, 1990

[87] PCT Pub. No.: WO89/12733
PCT Pub. Date: Dec. 28, 1989

[30] Foreign Application Priority Data

Jun. 15, 1988 [SE] Sweden ............................ 8802234-8

[51] Int. Cl.⁵ .................................................. F01N 7/08
[52] U.S. Cl. ................................... 181/227; 181/248; 181/252; 181/282
[58] Field of Search ............... 181/227, 228, 240, 247, 181/248, 252, 282

[56] References Cited

U.S. PATENT DOCUMENTS

| 2,718,273 | 9/1955 | Dehaus | 181/252 |
| 4,793,384 | 12/1988 | Lalikos et al. | 181/227 X |
| 4,851,298 | 7/1989 | Fukuda | 181/227 X |
| 4,854,416 | 8/1989 | Lalikos et al. | 181/227 X |
| 4,867,269 | 9/1989 | Lalikos et al. | 181/227 X |

Primary Examiner—Michael L. Gellner
Assistant Examiner—Khanh Dang
Attorney, Agent, or Firm—Ostrolenk, Faber, Gerb & Soffen

[57] ABSTRACT

An exhaust silencer has an inner, flexible pipe having a plurality of connected overlapping annular sections, an outer casing and a noise-suppressing material between the pipe and the outer casing. The casing has a first strip wound helically in a first direction of winding with partial overlap in a first overlap region between adjacent portions of the strips. A curable adhesive is arranged between the adjacent portions in the overlap region to provide a substantially leak proof seal.

6 Claims, 1 Drawing Sheet

EXHAUST SILENCER

BACKGROUND OF THE INVENTION

The present invention relates to an exhaust silencer of the type comprising an inner, flexible pipe, an outer casing and possibly a noise-suppressing material such as mineral wool, steel wool or the like between the pipe and the outer casing.

The known technology, represented by Swedish Patents No. 73 11 076-9 and No. 85 00 785-4 and British Patent No. 1 191 124, for instance, proposes a flexible or bendable exhaust silencer. The problem with this is that attempts have been made to furnish the exhaust pipe with two properties which are in opposition to each other. On the one hand the exhaust pipe shall be flexible or bendable while retaining an unrestricted cross section, and on the other hand the shape obtained during the bending operation must be retained after the pipe is fitted, for instance on the lower side of a private car, where the exhaust pipe may be subjected to considerable inertial force resulting in unintentional bending. The alternative is a relatively large number of points for attaching the exhaust pipe to the vehicle.

SUMMARY OF THE INVENTION

An object of the invention is therefore to provide an exhaust pipe of the type described in the introduction, by means of which said drawbacks are eliminated.

An exhaust silencer according to the invention is thus of the type comprising an inner, flexible pipe, an outer casing and possibly a noise-suppressing material between the pipe and the outer casing, the exhaust pipe being characterised in that the casing comprises a strip wound helically with partial overlap, a curable adhesive being arranged between the turns in the overlap region. According to one embodiment a second strip may be wound helically on the casing, the direction of winding being opposite to that of the strip comprising the casing. The second strip may also be wound with partial overlap and a curable adhesive is arranged between the turns, at least in the overlap region. One or both strips may be coated on the inner side with the curable adhesive. The outer strip will then adhere to the outer side of the first helically wound inner strip. The curable adhesive may be a thermosetting adhesive, allowing stabilization of the casing due to the heat from the exhaust fumes, for instance, when the exhaust pipe is fitted in a motor vehicle. Alternatively the adhesive may be curable when subjected to a component of the environment such as air or moisture, in which case the exhaust pipe is provided immediately after manufacture with an airtight wrapping intended to be removed immediately before the exhaust pipe is to be fitted, such as when the exhaust pipe is being bent.

The inner pipe may in principle be of any type. However, a pipe formed of relatively short pipe sections jointed by means of upset joints of ball-and-socket type is preferred so that the axial length remains constant even when bent. This reduces the risk of gaps appearing between the turns of the casing strip when the pipe is subjected to force such as axial stretching during bending operations.

BRIEF DESCRIPTION OF THE DRAWINGS

The invention, defined in the appended claims will now be described with reference to an embodiment illustrated only schematically in the drawings, in which:

DETAILED DESCRIPTION

Figure 1:
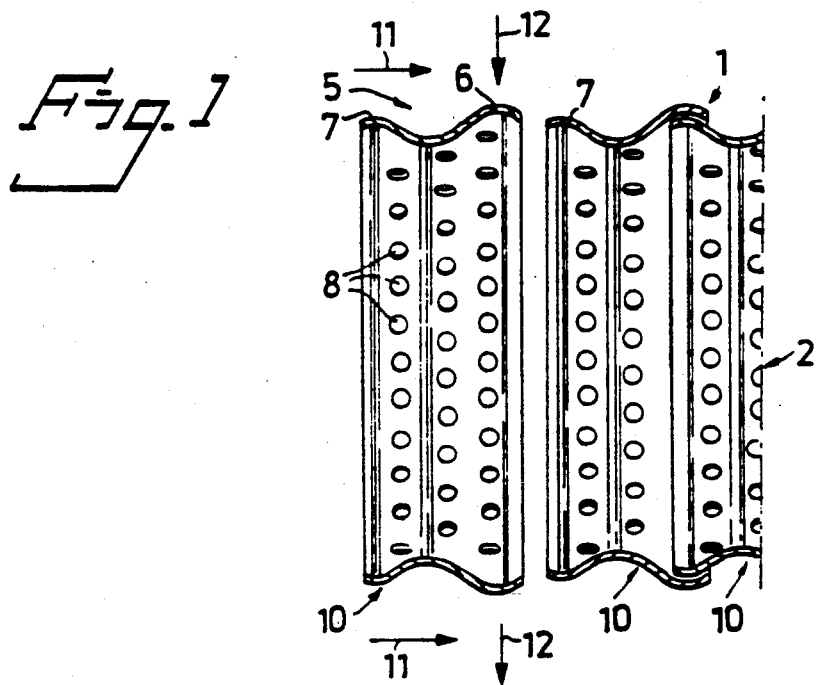
FIG. 1 shows schematically an axial section through a preferred inner pipe in the exhaust pipe according to the invention, and also suggests a method of manufacture.

It can be seen that the pipe 2 in FIG. 1 is formed of sheet-metal rings 10 consisting generally of cylindrical perforated elements with externally generally concave cross-sectional profile 5, the sections 6, 7 being of different lengths. The perforations 8 serve to facilitate noise suppression in the exhaust. As indicated in FIG. 1, the larger flange 6 of a ring 10 is fitted the smaller flange 7 onto an adjacent ring 10 in the direction of the arrow 11, a radially inwardly directed uppsetting force 12 being applied to the ring flange 6 so that it is shrunk over the flange 7, thus forming a joint 1 of ball-and-socket type. The upsetting may possibly be arranged to offer predetermined friction between adjacent rings 10 so that they remain in the position obtained at the bending operation.

Figure 2:
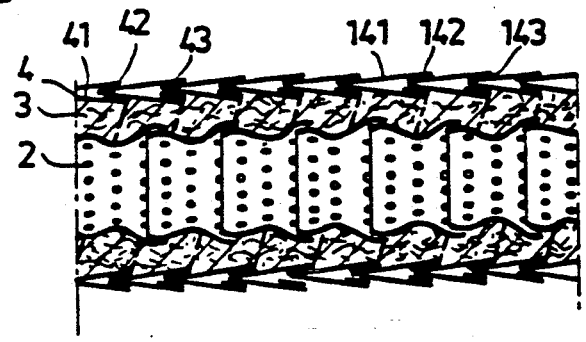
FIG. 2 shows schematically an axial section through an exhaust pipe according to the invention.

FIG. 2 shows that the pipe 2 may be provided externally with a noise-suppressing material 3, such as a layer of mineral wool, steel wool or the like.

The pipe 2, with the noise-suppressing material 3 if any, is then provided with a casing 4. The casing 4 comprises at least one strip 41 wound helically with partial overlap 42 between adjacent turns. A curable adhesive 43 is also provided in the overlap region between the turns. The strip 41 is preferably coated with curable adhesive 43 over its entire inner side.

The casing 4 may also include a second strip 141 which is wound outside the strip 41, with overlap 142 between adjacent turns, a curable adhesive 143 being provided at least in the overlap region in order to bind the winding turns together at curing. The adhesive 143 is preferably applied across the entire width of the strip 141, so that the strip 141 will adhere to the first helically wound strip 41.

It will be understood that the inner pipe 2 shown in FIG. 2 can easily be bent to the desired shape, while retaining an unrestricted cross section, and without noticeable resistance from the casing 4 or noise-suppressing material 3. The exhaust pipe can then be permanently fixed in the required shape by curing of the adhesive.

To produce an exhaust system for a private car, for instance, an exhaust pipe according to FIG. 2 can be cut to the desired length and then bent to a shape suitable for the make and model of the car. While the exhaust pipe is still in the moulding device, the curable adhesive 43 can be hardened and the pre-shaped exhaust pipe can then be fitted in conventional manner. Alternatively, the exhaust pipe shaped in a bending operation can be fitted without curing and the adhesive 43, 143 can then be cured by the hot exhaust fumes which will then flow through the exhaust system.

However, it is evident that some other type of curable adhesive may also be used, such as one which hardens under the influence of a component from the environment, such as moisture from the atmosphere. In this case, the exhaust pipe should be provided with an air-tight wrapping after manufacture, which will prevent the adhesive from hardening until the wrapping is intentionally removed at the time the pipe is to be given the desired shape and fitted.

I claim:

1. An exhaust silencer comprising an inner, flexible pipe comprising a plurality of connected overlapping annular sections, an outer casing and a noise-suppressing material between the pipe and the outer casing, wherein the casing comprises a first strip wound helically in a first direction of winding with partial overlap in a first overlap region between adjacent portions of the strips, a curable adhesive being arranged between the adjacent portions in the overlap region to provide a substantially leak proof seal.

2. An exhaust silencer as claimed in claim 1, wherein a second strip is wound helically on the first strip in a second direction of winding, the second direction of winding being opposite to that of the first direction.

3. An exhaust silencer as claimed in claim 2, wherein the second strip is wound with partial overlap in a second overlap region between adjacent portions of the second strip and a curable adhesive is arranged in the second overlap region.

4. An exhaust silencer as claimed in claim 1, wherein the second strip has an inner surface having a width and is coated with the curable adhesive over the width of the inner surface.

5. An exhaust silencer as claimed in claim 1, wherein the curable adhesive is a thermosetting adhesive.

6. An exhaust silencer as claimed in claim 1, wherein the adhesive is curable when subjected to an environmental component such as atmospheric moisture, and further comprising an air-tight wrapping around the outer casing intended to be removed immediately before the exhaust pipe is fitted to a vehicle.

* * * * *